Nov. 11, 1930.   P. C. DAY   1,781,656
FERRYBOAT
Filed April 7, 1928
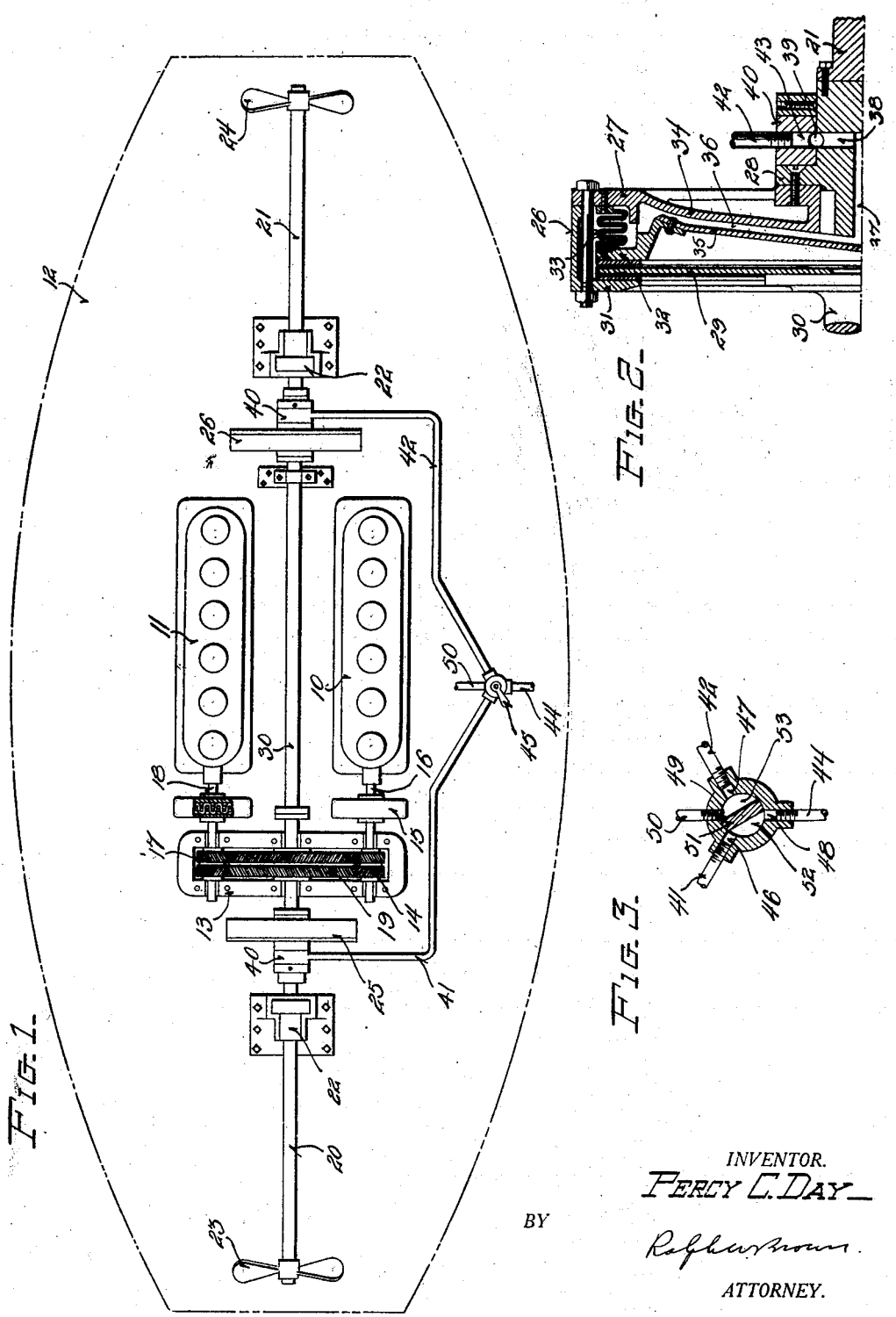
INVENTOR.
PERCY C. DAY
BY
ATTORNEY.

Patented Nov. 11, 1930

1,781,656

UNITED STATES PATENT OFFICE

PERCY C. DAY, OF MILWAUKEE, WISCONSIN, ASSIGNOR TO THE FALK CORPORATION, OF MILWAUKEE, WISCONSIN, A CORPORATION OF WISCONSIN

FERRYBOAT

Application filed April 7, 1928. Serial No. 268,168.

This invention relates to propulsion mechanism for ferry boats.

One object of the present invention is the provision of an improved oil engine drive for ferry boats capable of more economic operation than drives heretofore used.

Other more specific objects and advantages will appear from the following description of an illustrative embodiment of the present invention.

In the drawings:

Figure 1 is a diagrammatic plan view of a ferry boat drive mechanism embodying the present invention.

Fig. 2 is a fragmentary sectional view of a hydraulic clutch employed.

Fig. 3 is a sectional view of a control valve.

The drive mechanism shown in Figure 1 comprises a pair of internal combustion oil engines 10 and 11 of a well-known type, mounted centrally within a ferry boat 12 and disposed parallel with and at opposite sides of the longitudinal axis of the boat. The engines are geared together preferably through a speed reduction gear set 13. The gear set shown comprises a pinion 14 connected through a well-known type of flexible coupling 15 with one end of the crank shaft 16 of engine 10, and a pinion 17, of equal size, similarly connected to one end of the crank shaft 18 of engine 11. The pinions 14 and 17 mesh with an intermediate gear 19, so that the two engines are permanently connected for operation in definite phase relation.

Two propeller shafts 20 and 21 are provided at the opposite ends of the boat, each shaft being equipped with an end thrust bearing 22 of a well-known type. One of the shafts 20 carries and drives a right hand propeller 23 and the other a left hand propeller 24. An appropriate clutch 25 provides a releasable driving connection between the shaft 20 and the gear 19, and a similar clutch 26 provides a releasable driving connection between the shaft 21 and the gear 19.

The clutches shown are of a well-known hydraulic type although other forms of hydraulic or other power operated clutches may be employed without departing from the principles of the present invention. In this instance each clutch comprises a circular frame 27 bolted or otherwise fixed to a hub portion 28, attached to one of the propeller shafts, and a flexible disk 29, fixed to an end of the shaft 30 of the gear 19. The periphery of the disk 29 is disposed between fixed and movable gripper rings 31 and 32 carried by the frame 27. The movable ring 32 is supported by an expansion ring 33 which cooperates with a web 34 on the frame and a diaphragm 35 carried by the ring 32 to form a liquid tight pressure receiving chamber 36. Liquid is supplied to the chamber 36 through a longitudinal passage 37 in the hub 28 which communicates through radial passages 38 with an annular groove 39 formed in an appropriate slip ring 40 on the hub. A pipe 41 or 42 connected with the ring 40 communicates with groove 39 through a passage 43. The arrangement is such that, when the chamber 36 is expanded by hydraulic pressure transmitted through pipe 41 or 42 and connected passages, the movable ring 32 is forced toward the fixed ring 31 so as to grip the flexible disk 29 therebetween to thereby establish a driving connection between shaft 30 and the associated propeller shaft.

Hydraulic pressure is supplied from an appropriate source through a pipe 44 under the control of an appropriate valve 45. The valve shown comprises an appropriate housing having three ports 46, 47, and 48 for connection with the pipes 41, 42 and 44, respectively, and a port 49 for connection with a discharge pipe 50. A valve 51 rotatable in the housing divides the interior thereof into two chambers 52 and 53. With the valve in the position shown in Figure 3 pipe 42 is open to exhaust pipe 50 through chamber 53, and pipe 41 is open to the supply pipe 44 through chamber 52, so clutch 26 is open and clutch 25 closed. By rotating the valve counter-clockwise pipes 41, 42, and exhaust pipe 50 may be placed in communication through chamber 53, to thereby open both clutches; and by rotating the valve further in the same direction pipe 42 may be connected to pipe 44 through chamber 52, and pipe 41 connected to pipe 50 through chamer 53, to thereby close clutch 26 and leave clutch 25 open.

It will thus be noted that when clutch 25 is closed and clutch 26 open propeller 23 is operatively connected with the engine and drives the boat toward the right (Fig. 1) and when clutch 25 is open and clutch 26 closed propeller 23 is released and propeller 24 rendered active to drive the boat in the opposite direction. The use of a gear set such as that described not only maintains the two engines in definite phase relation but also permits a symmetrical disposition of the engines, as well as the propeller shafts, with respect to the boat. Furthermore the reduction in speed, rendered available by the gear set, permits the use of relatively high engine speeds with a consequent reduction in size of engines for a required power output.

Various changes may be made in the embodiment of the invention hereinabove specifically described without departing from or sacrificing the advantages of the invention as defined in the appended claims.

I claim:—

1. A propulsion mechanism for ferry boats comprising a propeller shaft at each end of the boat, a right hand propeller on one shaft, a left hand propeller on the other shaft, a pair of internal combustion engines, and means including speed reduction gearing and cooperating clutches operable to connect both of said engines in driving relation with one or the other of said shafts selectively to thereby drive the boat in one direction or the other.

2. A propulsion mechanism for ferry boats comprising a shaft at each end of the boat, a right hand propeller on one shaft, a left hand propeller on the other shaft, a pair of internal combustion engines, gearing connecting said engines for operation in definite phase relation, clutch mechanisms for effecting a driving connection between said gearing and either of said shafts selectively to thereby drive the boat in one direction or the other.

3. A propulsion mechanism for ferry boats comprising a shaft at each end of the boat, a right hand propeller on one shaft, a left hand propeller on the other shaft, a pair of internal combustion engines, a gear set comprising a gear driven by each engine and an intermediate gear driven by both of said first named gears, and a clutch between said intermediate gear and each of said shafts.

4. A propulsion mechanism for ferry boats comprising a propeller at each end of the boat for driving the same in one direction or the other, an internal combustion engine, gearing driven by said engine for driving said propellers, and means adjustable to render said gearing active on one or the other of said propellers selectively to thereby drive the boat in either direction.

5. A propulsion mechanism for ferry boats comprising a propeller shaft at each end of the boat, a right hand propeller on one shaft, a left hand propeller on the other shaft, a plurality of internal combustion engines disposed at opposite sides of said shafts, gearing connecting said engines for operation in definite phase relation, and means for connecting said gearing with one or the other of said shafts selectively to thereby drive the boat in one direction or the other.

In witness whereof, I hereunto subscribe my name this 30th day of March, 1927.

PERCY C. DAY.